United States Patent [19]
Parr

[11] Patent Number: 5,377,623
[45] Date of Patent: Jan. 3, 1995

[54] METHOD AND APPARATUS FOR RESCUING FROGS FROM A SWIMMING POOL

[76] Inventor: Jeffrey A. Parr, 16 Andromeda Dr., Milton, Fla. 32570

[21] Appl. No.: 199,101

[22] Filed: Feb. 22, 1994

Related U.S. Application Data

[63] Continuation-in-part of Ser. No. 28,539, Mar. 8, 1993.

[51] Int. Cl.⁶ .......................... A01K 61/00; E04H 4/08
[52] U.S. Cl. ........................................ 119/221; 4/496; 119/256
[58] Field of Search ............... 119/200, 221, 256, 174; 248/152, 218.4, 219.3, 219.4; 108/152; 4/496, 504

[56] References Cited

U.S. PATENT DOCUMENTS

| | | | |
|---|---|---|---|
| 90,785 | 6/1869 | Ruggles . | |
| 2,427,697 | 9/1947 | Weidler | 65/15 |
| 2,481,604 | 9/1949 | Lorenzen | 108/152 |
| 2,544,817 | 3/1951 | White | 248/221 |
| 3,076,557 | 2/1963 | Husted et al. | 108/152 |
| 3,267,887 | 8/1966 | Boyd | 108/152 |
| 3,468,428 | 9/1969 | Reibold | 211/144 |
| 3,976,273 | 8/1976 | Kussow | 248/221 R |
| 4,311,101 | 1/1982 | de Almagro | 108/152 |
| 4,666,118 | 5/1987 | Busche | 248/288.5 |
| 4,903,926 | 2/1990 | McHarry et al. | 4/496 |
| 4,961,555 | 10/1990 | Egan, Jr. | 248/231.8 |
| 5,083,326 | 1/1992 | Casebier, III | 4/504 |
| 5,085,391 | 2/1992 | Berger et al. | 248/311.2 |

*Primary Examiner*—Todd E. Manahan
*Attorney, Agent, or Firm*—Geoffrey A. Mantooth; Richard B. Taylor

[57] ABSTRACT

A device for supporting a frog in a swimming pool to keep the frog from being lodged in the pool skimmer includes a pad with a convex top surface that extends slightly below the water line so that a frog may climb on the pad. The material is textured so frog cannot easily slip off. The device is dark colored so the frog can see it in the water. The device is supported and attached to a ladder of a swimming pool with a snap on C-shaped clamp dimensioned and arranged to support the device at the water line.

10 Claims, 6 Drawing Sheets

METHOD AND APPARATUS FOR RESCUING FROGS FROM A SWIMMING POOL

This is a continuation-in-part application of my co-pending application Ser. No. 08/028,539, filed Mar. 8, 1993.

BACKGROUND OF THE INVENTION

1. Field of the Invention

The present invention relates to a frog saving device, in particular to a device for location in a swimming pool for enabling frogs trapped in the swimming pool to escape.

2. Description of the Related Art

Frogs often jump inadvertently into swimming pools. This is especially true during rainy weather. Once a frog jumps into a swimming pool the frog is trapped in the pool. The sides of the pool prevent the frog from escaping since the sides are too steep for the frog to climb, and the frog cannot jump back out of the water over a side of the pool. The trapped frog typically swims about the sides of the pool until the frog tires and drowns or until the frog can be netted and removed from the pool during routine maintenance. Drowned frogs often end up in a pool skimmer or other filtering device, where they present a clean up problem for the pool owner.

What is needed is a frog saving mechanism for rescuing trapped frogs from a swimming pool without outside intervention, thereby saving the pool owner the task of removing and disposing of deceased frogs from the pool skimmer while helping the environment by saving the frogs from drowning.

SUMMARY OF THE INVENTION

Therefore, it is an object of the present invention to provide an apparatus for saving frogs that are trapped in swimming pools.

It is a further object of the invention to provide an apparatus that will reduce the number of dead frogs ending up in a swimming pool skimmer thereby saving a pool owner from the task fo removing and disposing dead frogs from the skimmer.

A frog saving apparatus is provided having a convexly rounded surface for supporting a frog. A clamp is coupled to an edge of the surface extending away from the surface. The clamp is structured and arranged to retain the clamp and the surface about a stationary object.

In one aspect of the invention, the convexly rounded surface is a top surface of a pad. The pad has a bottom surface and an edge, where the edge extends between the convexly rounded top surface and the bottom surface. The clamp is formed by a semi-rigid C-shaped wall coupled to the pad.

In a further aspect of the invention, the clamp is secured to a ladder rail of a swimming pool ladder located within a swimming pool. The clamp and the convexly rounded surface are thereby securely retained in the swimming pool.

Frogs trapped in a swimming pool equipped with the frog saving apparatus of the present invention can easily escape the swimming pool. A frog can swim about the swimming pool until the frog encounters the frog saving apparatus. The frog may climb out of the swimming pool water onto the frog saving apparatus. The frog may leap out of the swimming pool from the apparatus, or the frog may rest upon the apparatus until the frog is netted out of the swimming pool during routine pool maintenance.

DESCRIPTION OF THE PREFERRED EMBODIMENT

The frog saver is a plastic pad that attaches to the ladder in inground pools. Once attached, the frog saver acts as a ledge for frogs who become accidentally trapped in pools. The frog can jump from the frog saver out of the pool or be removed from the pad with a net by the owner. This invention has a grip on the end to accommodate to a pool ladder or hand rail. The pad can be molded from plastic.

FIGS. 1-5 show a first embodiment of the frog saver device.

Figure 6:
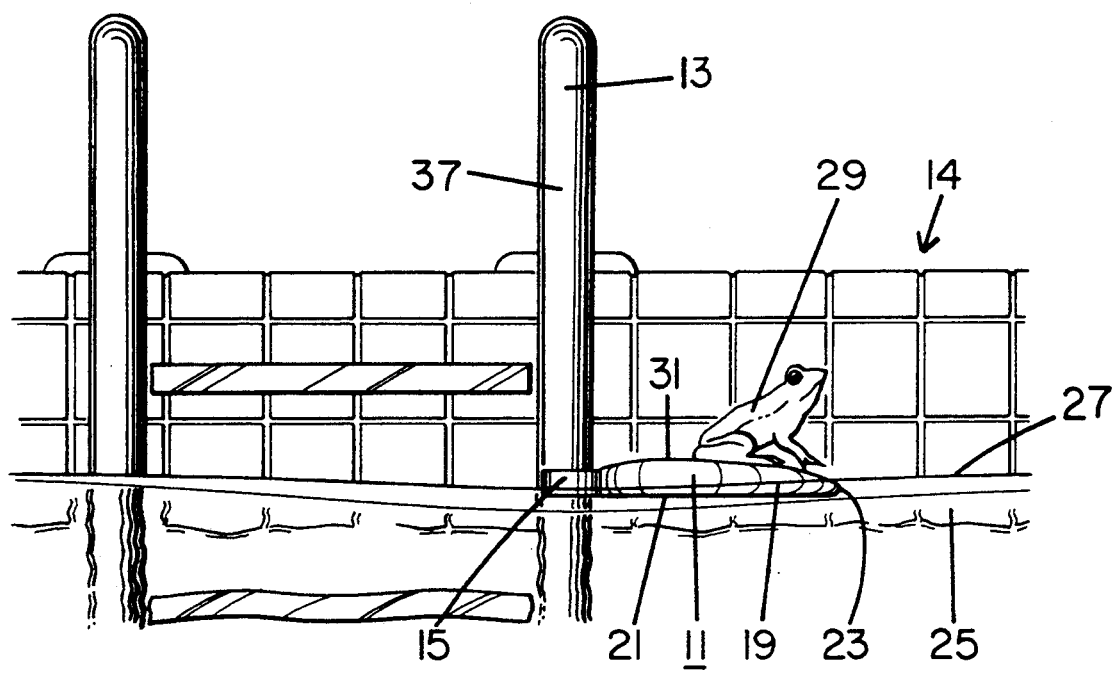
FIG. 6 is a side view of a second embodiment of the frog saver apparatus located in a swimming pool and attached to a swimming pool ladder, and having a frog located thereon.
Figure 7:
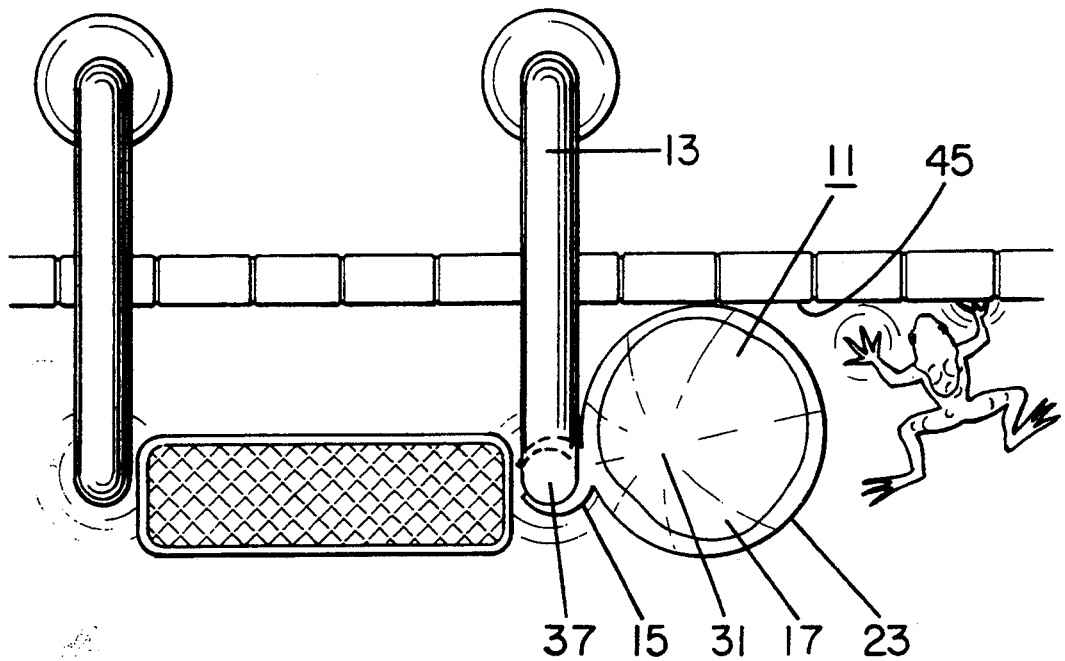
FIG. 7 is a top plan view of a second embodiment located in a swimming pool attached to a swimming pool ladder.

Referring now to FIGS. 6 and 7, the frog saver device 11 of the current invention in accordance with a second embodiment is shown. The frog saver device 11 is a plastic pad that attaches to a ladder 13 in an inground swimming pool 14. Once attached, the frog saver device 11 acts as a ledge for frogs 29 that become accidentally trapped in the pool. The frogs can jump from the frog saver device 11 out of the pool or be removed from the pad with a net by the pool owner.

The frog saver device 11 comprises a clamp 15 coupled to a pad 17. Preferably the clamp 15 and the pad 17 are connected in a unitary one-piece construction, although they could be fabricated separately and attached together by suitable means such as bonding.

The pad 17 is a wall having the shape of a disc having a convex top surface 19 and a planar lower surface 21 joined about a rounded disc edge 23. When the device 11 is located in a swimming pool, the lower surface 21 is located in the water 25. The disc edge 23 is located slightly beneath the surface 27 of the water 25 so that a frog 29 encountering the device 11 will have no difficulty climbing aboard the top surface 19 of the pad 17. The convex top surface 19 slopes upwardly out of the water 25 from the disc edge 23 to a domed point 31 located centrally on the top surface 19 of the pad 17. A large portion of the top surface 19 is located out of the pool water 25 to provide a frog 29 a surface to rest upon, as well as a surface from which the frog 29 may jump to escape the swimming pool. In a preferred embodiment, the top surface 19 of the pad 17 is textured to enhance the frog's traction on the surface 19. For example, the top surface can be roughened. The pad 17 is constructed of a semi-rigid plastic material which is strong enough to support a frog, but won't injure a swimmer who accidentally bumps into the device 11. The pad 17 may also be constructed or colored with a dark material (for example dark green) which enhances the visibility of the device to a frog in the water.

Figure 1:
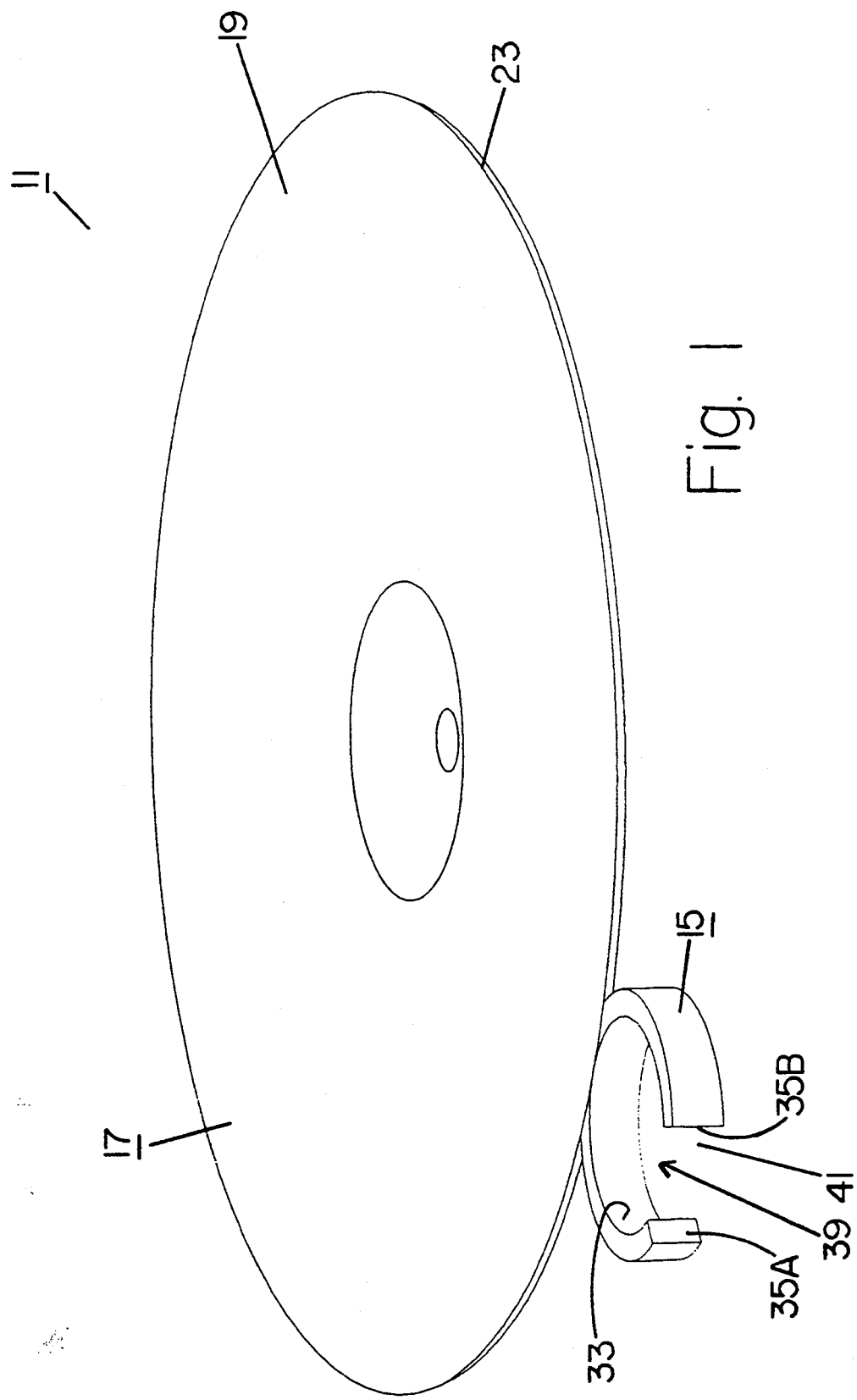
FIG. 1 is a top perspective view of a first embodiment of the frog saving apparatus.
Figure 2:
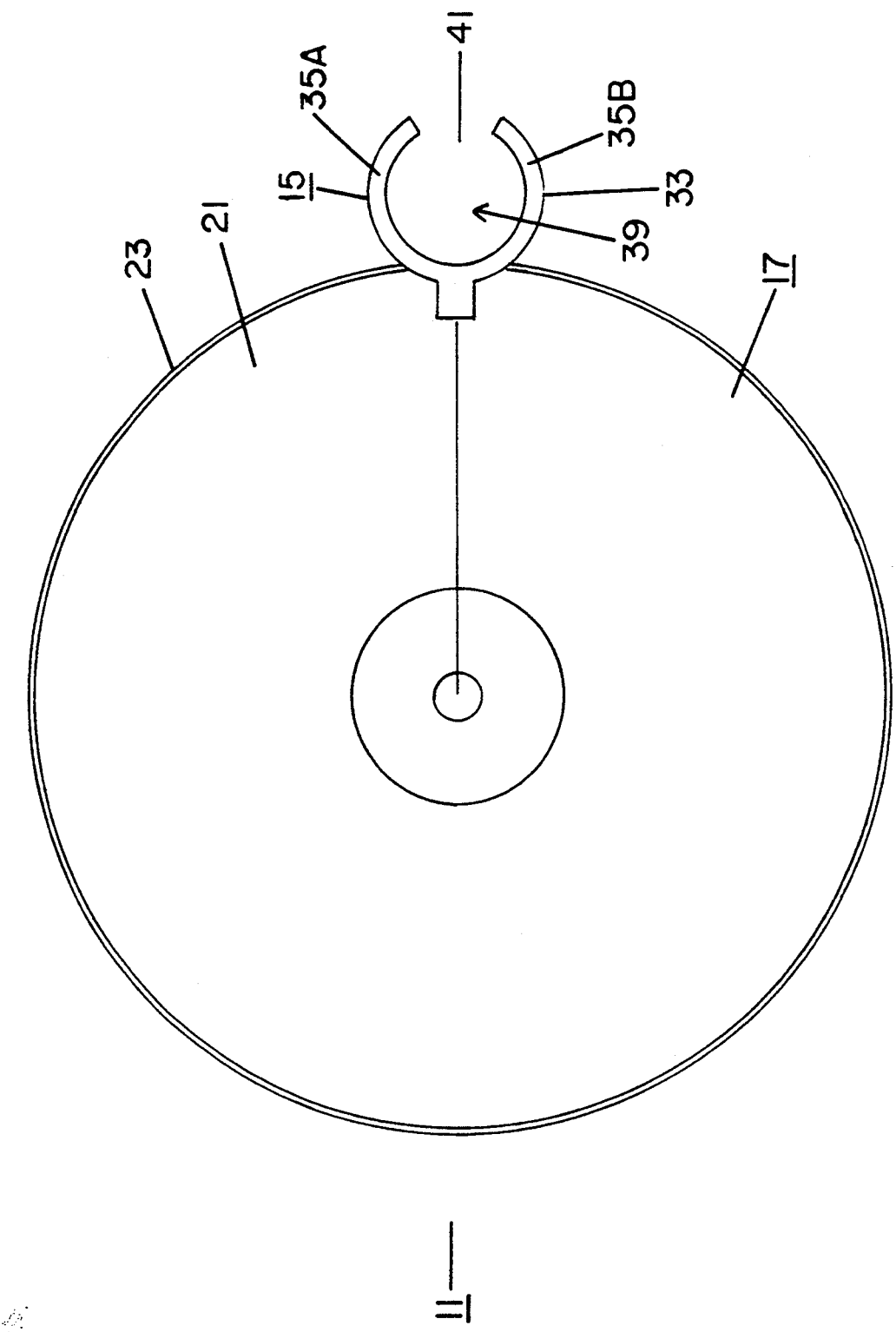
FIG. 2 is a bottom plan view of the first embodiment of the frog saving apparatus.
Figure 3:
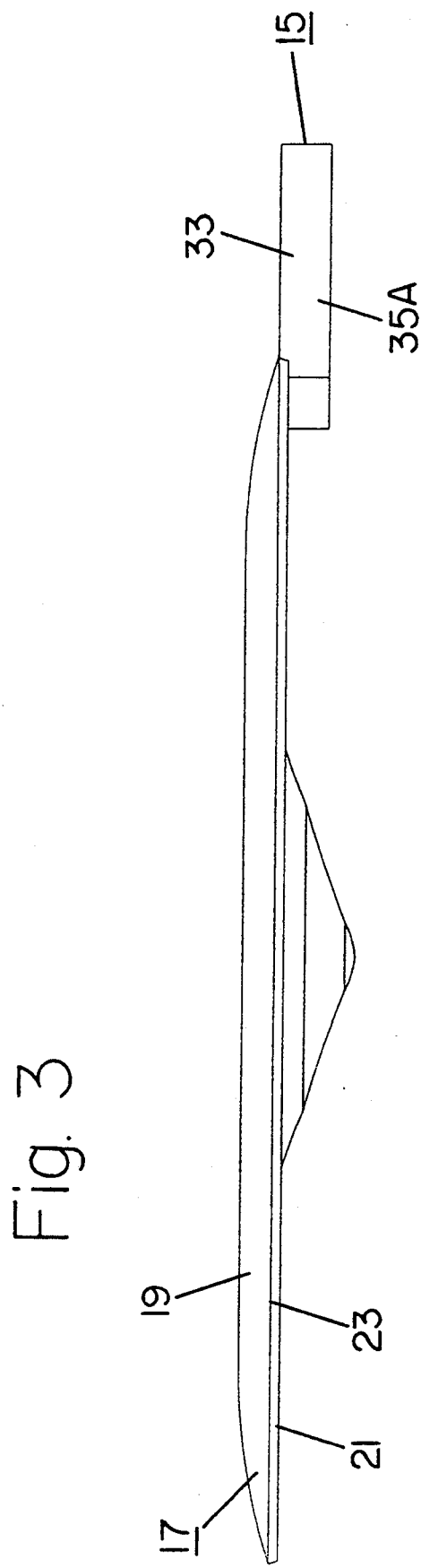
FIG. 3 is a side elevation view of the first embodiment.
Figure 4:
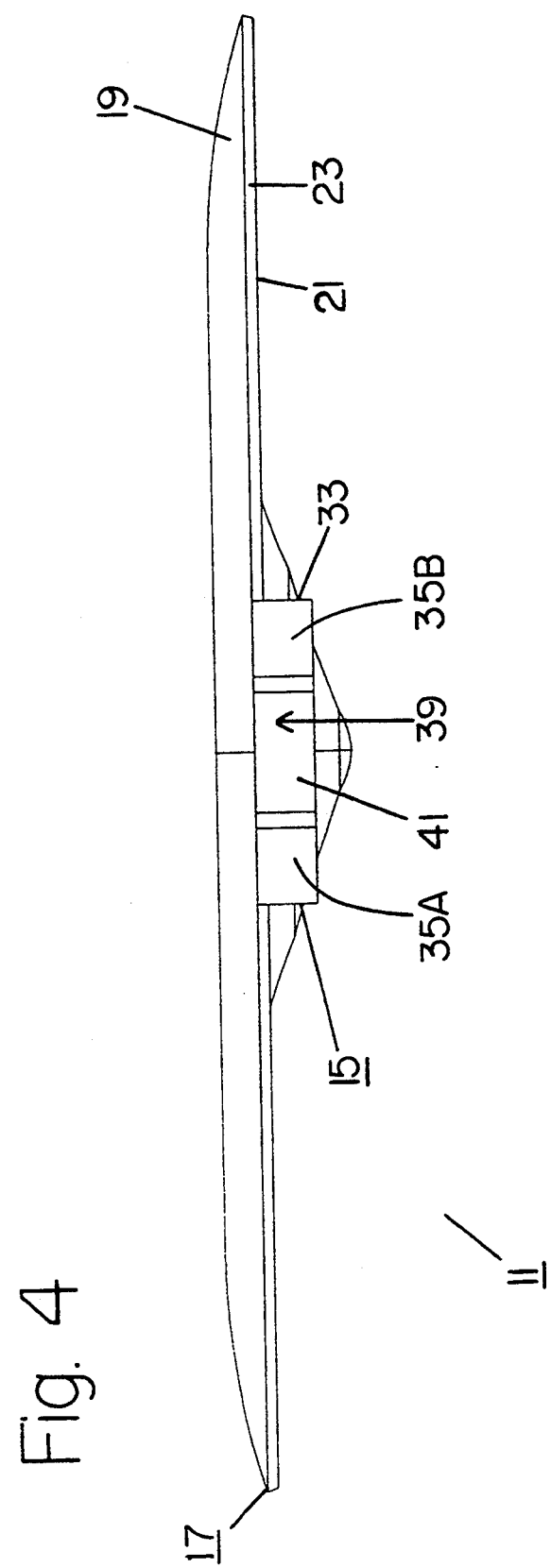
FIG. 4 is a rearward elevation view of the first embodiment.
Figure 5:
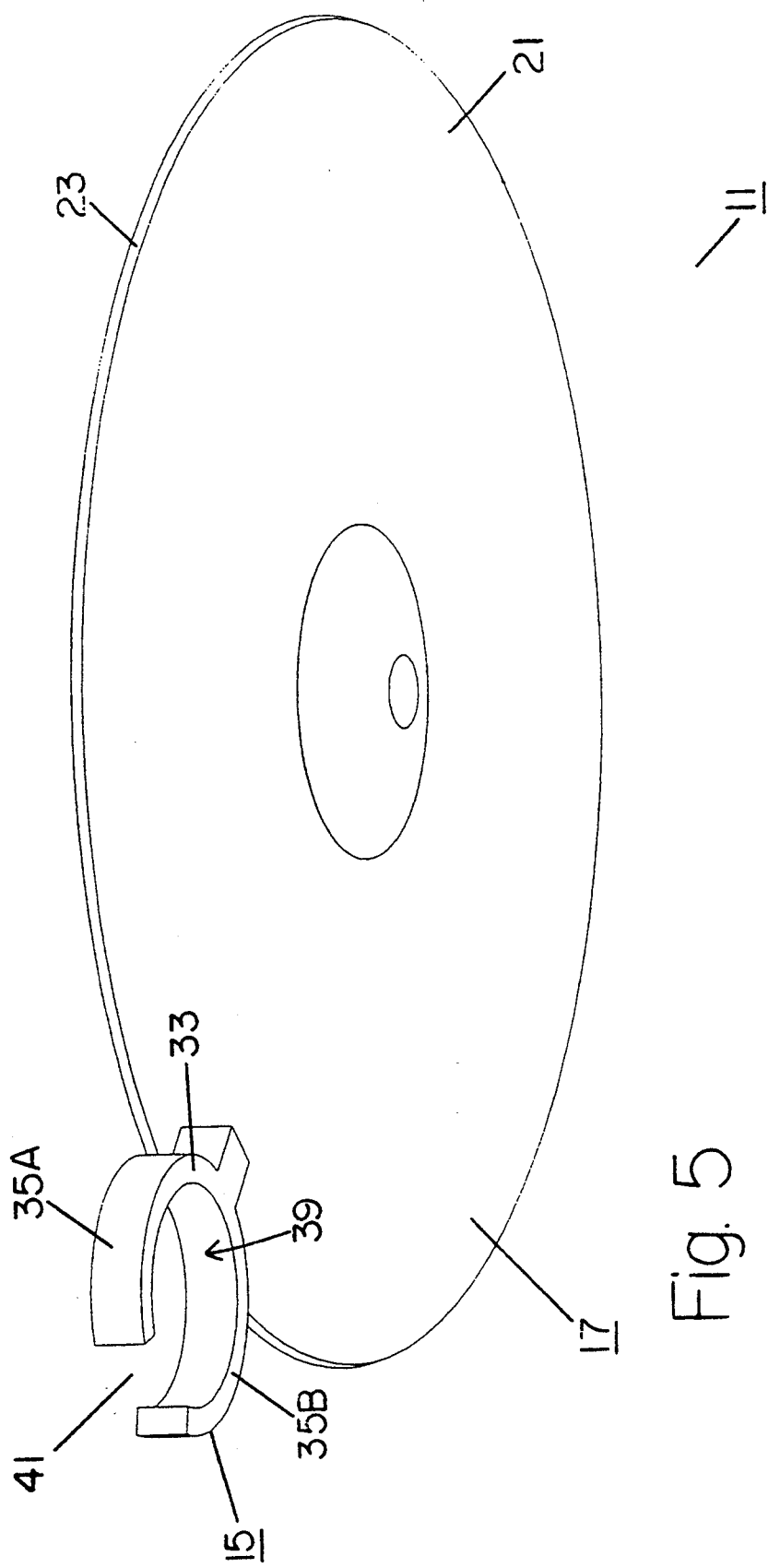
FIG. 5 is a bottom perspective view of the first embodiment.

The clamp 15 is coupled to the pad 17 extending from the pad 17. Referring to FIG. 1, the clamp 15 has a clamp ring wall 33 which has a C-shaped cross-sectional configuration. The back of the C-shaped clamp ring wall 33 is coupled to the pad 17 along a portion of the disc edge 23 of the pad 17 so that the clamp ring wall 33 forms prongs 35A and 35B that extend from the pad 17. The clamp ring wall 33 is attached to the pad 17 either by integrally coupling the clamp ring wall 33 and the pad 17 so that the clamp 15 and pad 17 are formed in a unitary one-piece construction or by bonding the clamp ring wall 33 to the pad 17. The clamp 15 is formed of a semi-rigid plastic material capable of securing the clamp 15 and the pad 17 to a ladder 13.

The clamp 15 is used to secure the device 11 to a ladder rail 37 of the ladder 13 along the surface 27 of the water 25 within the pool. The clamp ring wall 33 partially surrounds a clamp bore 39 into which the ladder rail 37 may be inserted. A gap 41 extends between the end portions of the prongs 35A and 35B, which gap communicates with the clamp bore 39. The clamp 15 is installed onto the ladder rail 37 by locating the rail 37 within the gap 41 and then pushing the clamp into the rail, wherein the prongs 35A and 35B are forced apart. When the rail is located inside of the clamp bore 39, the clamp ring wall 33 encircles a majority of the diameter of the ladder rail 37 and holds the device 11 to the ladder 13.

In a preferred embodiment, the device has the following dimensions. The pad 17 has a diameter of ten inches. The pad 17 is one inch thick from the lower surface 21 to the domed point 31 centered in the top surface 19, and is one-quarter of an inch thick at the disc edge 23. In another embodiment the pad 17 is one-half of an inch thick at the disc edge 23. The clamp 15 extends two inches from the pad 17 so the device 11 is twelve inches long across the clamp 15 and the pad 17. The clamp ring wall 33 is one-half of an inch tall. The clamp bore 39 and the gap 41 are large enough to accommodate a six inch ladder rail 37 which is standard.

The attached device 11 is positioned on the water surface 27 adjacent the ladder 13. The clamp 15 allows the device 11 to be slid along the length of the ladder rail 37 to the desired position relative to the water level 27. Once the device is installed on the ladder, it is swung to the side 45 of the pool 14. A portion of the disc edge 23 of the pad 17 is located touching the side 45 of the pool so that the device 11 is located where a trapped frog 29 will encounter the device 11 when trying to escape the pool. The device 11 is also positioned away from the swimming area of the pool when located touching the side 45 of the pool. Thus, swimmers are less likely to contact the device 11. Possible injury to swimmers is reduced even further by making the device from a semi-rigid plastic.

A frog 29 trapped in the pool will swim along the sides of the pool at the water surface 27 searching for an escape route from the pool. The trapped frog 29 is prevented from escaping over the sides of the pool because the sides are too steep for the frog to scale and the frog cannot jump over the sides from within the water 25. As the frog 29 moves along the sides of the pool the frog 29 will eventually encounter the frog saver device 11 which is located touching a side of the pool. The frog 29 can climb onto the top surface 21 of the pad 17 of the device 11 to get out of the water 27. The frog 29 may then leap over the side of the pool 45 frown the pad 17 to escape the pool, or the frog 29 can remain on the pad 17 and be removed therefrom with a net.

Although the present invention has been described as being mounted to a pool ladder, other types of mounting devices can be used. For example, a temporary pipe can be located in the pool at the water's edge.

The foregoing disclosure and the showings made in the drawings are merely illustrative of the principles of this invention and are not to be interpreted in a limiting sense.

I claim:

1. A frog saving apparatus, comprising:
   a rounded, substantially convey continuous to surface for supporting a frog thereon;
   a clamp integrally coupled to an edge of said rounded surface, said clamp being C-shaped having opposing arms extending away from said rounded surface, said arms being adapted to frictionally grip a mounting member.

2. The frog saving apparatus of claim 1, wherein:
   said rounded surface is textured so that said surface will provide traction to a frog.

3. A pool of water, comprising:
   a wall of said pool;
   a body of water contained within said
   a mounting device of said pool located near said wall of said pool;
   a frog saving apparatus comprising a member and a clamp;
   said member of said frog saving apparatus having an edge and a top surface, said top surface being rounded so as to form a peak in a center portion of said member, with said edge being lower than said peak;
   said clamp coupled to said member and coupled to said mounting device.

4. The pool of claim 3, wherein said mounting device further comprises a rail of a pool ladder.

5. The pool of claim 3, wherein said clamp is C-shaped.

6. The pool of water of claim 3, wherein:
   said member is positioned at a water surface of said pool of water.

7. The pool of claim 3, wherein said top surface is textured.

8. A method of saving frogs that jump into a pool of water, where said pool of water has a mounting device positioned near a side of said pool, comprising the steps of:
   providing a horizontal platform;
   coupling said platform to said mounting device, wherein a frog can exit the water by climbing onto said platform.

9. The method of saving frogs of claim 8, further comprising the steps of:
   adjusting a position of said platform on said mounting device to locate said platform at the surface of the water of said pool of water;
   maintaining said platform on said mounting device at the water surface.

10. The method of saving frogs of claim 8, further comprising the step of pivoting said platform about said mounting device to position said platform adjacent said side of said pool.

* * * * *